US006551729B2

(12) United States Patent
Taira et al.

(10) Patent No.: US 6,551,729 B2
(45) Date of Patent: Apr. 22, 2003

(54) CONDUCTIVE PASTE AND CERAMIC ELECTRONIC ELEMENT USING THE SAME

(75) Inventors: Shinichi Taira, Yasu-gun (JP); Atsuyoshi Maeda, Otsu (JP)

(73) Assignee: Murata Manufacturing Co. Ltd (JP)

( * ) Notice: Subject to any disclaimer, the term of this patent is extended or adjusted under 35 U.S.C. 154(b) by 0 days.

(21) Appl. No.: 09/934,230

(22) Filed: Aug. 21, 2001

(65) Prior Publication Data

US 2002/0096664 A1 Jul. 25, 2002

(30) Foreign Application Priority Data

Aug. 24, 2000 (JP) ....................................... 2000-254048

(51) Int. Cl.$^{7}$ ........................... B32B 9/04; B32B 17/06; H01B 1/00; H01B 1/12

(52) U.S. Cl. ....................... 428/699; 428/697; 428/432; 252/500; 252/518.1; 252/519.3; 252/520.3; 252/521.2

(58) Field of Search ................................ 252/500, 513, 252/514, 518.1, 519.3, 520.3, 521.2

(56) References Cited

U.S. PATENT DOCUMENTS 5,561,587 A * 10/1996 Sanada .................... 361/306.1
5,785,879 A * 7/1998 Kawamura et al. ........... 216/95

FOREIGN PATENT DOCUMENTS

| | | |
|---|---|---|
| JP | 06-097699 | 4/1994 |
| JP | 06-116517 | 4/1994 |
| JP | 07-142827 | 6/1995 |
| JP | 08-325487 | 12/1996 |
| JP | 09-017233 | 1/1997 |
| JP | 11-096833 | 4/1999 |

OTHER PUBLICATIONS

CRC, Handbook of Chemistry and Physics, 1993–94, CRC Press, 74$^{th}$ ed, 3–215 and 3–488, no month.*

* cited by examiner

*Primary Examiner*—Deborah Jones
*Assistant Examiner*—G. Blackwell-Rudasill
(74) *Attorney, Agent, or Firm*—Dickstein Shapiro Morin & Oshinksky, LLP

(57) ABSTRACT

A conductive paste is provided which can prevent the generation of wrinkles on electrode films after drying and which can be used for forming a highly reliable ceramic electronic element having superior appearance. The conductive paste contains a conductive component such as silver or copper and an organic vehicle. The organic vehicle contains an organic binder, a first solvent dissolving the organic binder and a second solvent substantially not dissolving the organic binder, wherein the boiling point of the first solvent is higher than that of the second solvent or is higher than the temperature at the end of distillation thereof by about 20° C. or more, and the content of the second solvent is about 30 to 70 wt % of the organic vehicle.

19 Claims, 1 Drawing Sheet

CONDUCTIVE PASTE AND CERAMIC ELECTRONIC ELEMENT USING THE SAME

BACKGROUND OF THE INVENTION

1. Field of the Invention

The present invention relates to conductive pastes and ceramic electronic elements, and more particularly, relates to a conductive paste preferably used for forming terminal electrodes of a chip-type ceramic electronic element and to a ceramic electronic element provided with terminal electrodes formed by using the conductive paste.

2. Description of the Related Art

Heretofore, terminal electrodes used as input/output terminals or ground terminals for ceramic electronic elements are formed by, for example, applying a conductive paste to ceramic bodies by dipping or the like, drying the films thus formed and firing the dried films. The conductive paste used for this application generally comprises a conductive component, an organic vehicle and an inorganic binder such as a glass frit.

As the organic vehicle, a material comprising an organic binder, such as ethyl cellulose, nitrocellulose or an acrylic resin, as a primary component and an organic solvent, such as terpineol, 2-butoxyethanol, diethylene glycol monobutyl ether is used.

When a conventional conductive paste is applied to a ceramic body by dipping or the like and is then dried, wrinkles may be formed on the surface of the dried coating film thus formed in some cases. The formation of wrinkles is not preferable in appearance and, in addition, easily generates cracks in the terminal electrodes after firing is performed, and as a result, the reliability of the ceramic electronic element is significantly degraded.

As the reason the wrinkles are formed on the surface of the coating film, rapid evaporation of a solvent contained in the conductive paste during drying may be considered. Since the organic solvent used for the conventional organic vehicles dissolves the organic binder, the organic binder contained in the organic vehicle is precipitated when the organic solvent is evaporated. When the coating film composed of the conductive paste is dried by blowing hot air, the organic binder is precipitated on the surface of the coating film, since the solvent present in the vicinity of the surface of the coating film is preferentially evaporated in an early drying stage, and as a result, a resinous film is formed thereon. In addition, when the drying is further continued, the coating film shrinks by a volume corresponding to the amount of the evaporated solvent, but, since the surface area of the resinous film of the organic binder described above is larger than the surface area of the shrunk coating film, the resinous film is present excessively, and as a result, the wrinkles are generated on the surface of the coating film after drying is performed.

In order to prevent the generation of a resinous film of organic binder on the surface of the coating film in the early drying stage, a method may be considered in which the drying temperature is decreased or a solvent having a higher boiling point is used. However, the time required for drying is prolonged thereby, and as a result, there is a problem in that the productivity is decreased. Also, when drying is insufficiently performed, the terminal electrodes (electrode films) are likely to peel off after drying is performed.

SUMMARY OF THE INVENTION

Accordingly, the present invention was made to solve the problems described above, and an object of the present invention is to provide a conductive paste which can suppress the generation of wrinkles on electrode films after drying and can suppress the generation of cracks in terminal electrodes after firing, and in addition, another object of the present invention is to provide a ceramic electronic element having superior appearance and reliable electrical properties.

To these ends, the conductive paste of the present invention comprises a conductive component and an organic vehicle, in which the organic vehicle comprises an organic binder, a first solvent dissolving the organic binder and a second solvent not substantially dissolving the organic binder, wherein the boiling point of the first solvent is higher than that of the second solvent or is higher than the temperature at the end of distillation thereof by about 20° C. or more, and the content of the second solvent is about 30 to 70 wt % of the organic vehicle.

In addition, the boiling point of the first solvent is preferably higher than the boiling point of the second solvent or is preferably higher than the temperature at the end of distillation thereof by about 30° C. or more.

Furthermore, the conductive paste of the present invention may further comprise an inorganic binder.

The ceramic electronic element of the present invention comprises a ceramic body and terminal electrodes provided so as to be in contact with the ceramic body, wherein the terminal electrodes are formed of the conductive paste of the present invention described above.

DESCRIPTION OF THE PREFERRED EMBODIMENTS

Figure 1:
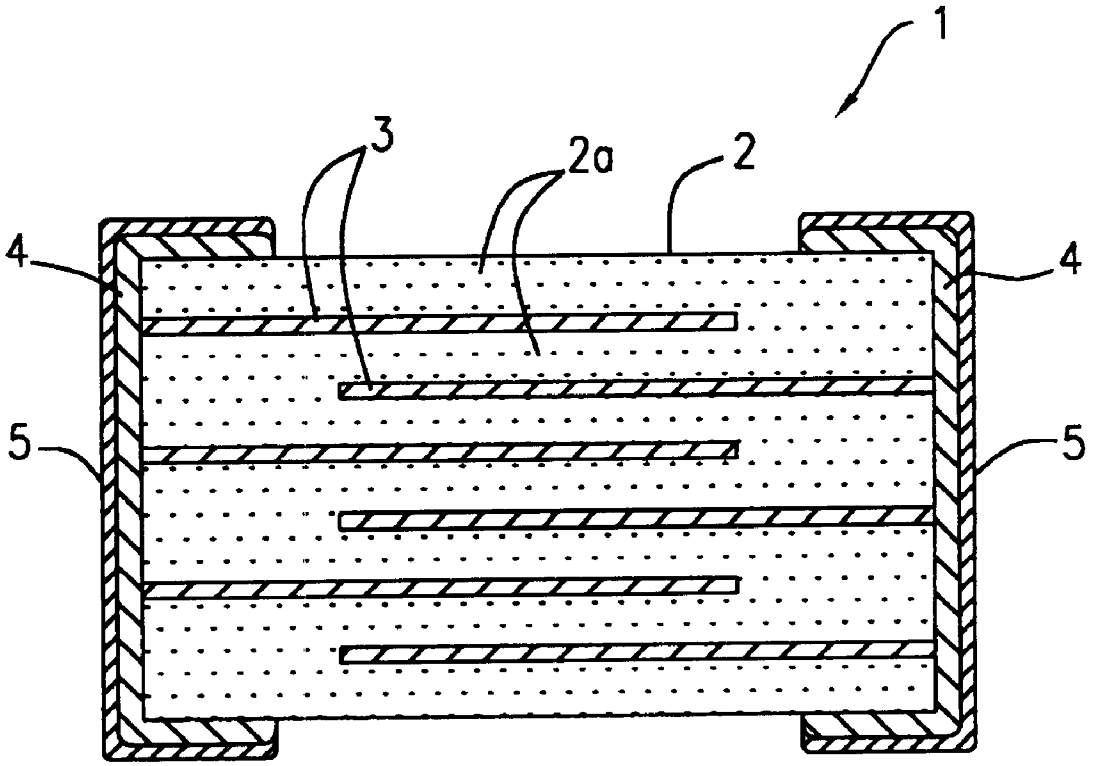
FIG. 1 is a cross-sectional view of a ceramic electronic element of an embodiment according to the present invention.

The conductive paste of the present invention comprises as the solvents in the organic vehicle, a first solvent dissolving an organic binder and a second solvent which does not substantially dissolve the organic binder, wherein the boiling point of the first solvent is higher than that of the second solvent or is higher than the temperature at the end of distillation thereof by 20° C. or more. The term "substantially not dissolving" means that less than about 1% of the binder dissolves at ambient temperature. The solubility of the organic binder to the second solvent is preferably 1/10 or less to the solubility of the organic binder to the first solvent.

Since the second solvent is present during the early drying stage, the second solvent having a relatively low boiling point or a relatively low distillation temperature is preferentially evaporated. Since the second solvent does not substantially dissolve the organic binder, that is, since the organic binder does not substantially dissolve in the second solvent, the organic binder is not precipitated during the evaporation of the second solvent, and hence, the formation of a film of the organic binder is unlikely to occur on the coated film of the conductive paste. After the second solvent is evaporated, the first solvent having a higher boiling point is then evaporated. Since the conductive paste originally contained the second solvent, the content of the first solvent in the conductive paste is relatively small, and hence, the amount of the organic binder precipitated by the evaporation of the first solvent is relatively small, whereby the generation of wrinkles is suppressed even when the electrode film shrinks by a volume corresponding to the amount of the first solvent.

The content of the second solvent must be about 30 to 70 wt % of the organic vehicle.

When the content of the second solvent is about 30 wt % or more, the effect of suppressing the generation of wrinkles can be fully obtained. In addition, when the content of the second solvent is about 70 wt % or less, the organic vehicle is not gelled and the second solvent in the organic vehicle does not separate with time, whereby a conductive paste having superior fluidity and dispersion stability is obtained which can be used for dip coating.

The difference in boiling point between the first solvent having a high boiling point and the second solvent having a low boiling point must be about 20° C. or more and is preferably about 30° C. or more.

When the difference in boiling point is about 30° C. or more, the effect of suppressing the generation of wrinkles can be more fully obtained. In the case in which the boiling point of a mixed solvent is not clearly known, the temperature at the end of distillation thereof can be regarded as the boiling point of the second solvent.

According to the present invention, in the case in which the coating film formed of the conductive paste is dried and the second solvent is first evaporated, and the first solvent is subsequently evaporated, the generation of wrinkles on the surface of the coating film can be suppressed in an early drying stage (that is, in a stage in which the second solvent is evaporated), and in addition, remaining first solvent can be evaporated smoothly.

The conductive paste of the present invention may further comprise an inorganic binder. The inorganic binder is not specifically limited, and for example, various known glass frits, such as a B—Si—Ba—O-based glass frit, a B—Si—Zn—O-based glass frit and a B—Si—Pb—O-based glass frit, may be optionally used.

The conductive component of the conductive paste of the present invention is not specifically limited, and for example, at least one powdered conductive material of a noble metal selected from the group consisting of Ag, Pd, Au, Pt and the like and a base metal selected from the group consisting of Ni, Cu, Al and the like may be optionally used.

The organic binder and the solvent used in the present invention are not specifically limited, and for example, as the organic binder, any known material, such as ethyl cellulose, nitrocellulose or an acrylic resin, may be mentioned. In addition, as the first solvent, diethylene glycol monobutyl ether may be mentioned, and as the second solvent, a hydrocarbon-based mixed solvent or the like which does not dissolve the organic binder may be optionally used.

In addition, the contents of the conductive component and the organic vehicle in the conductive paste of the present invention are not specifically limited, and for example, a mixture composed of 76 wt % of powdered Ag and 24 wt % of the organic vehicle may be used.

Next, a ceramic electronic element of an embodiment according to the present invention will be described in detail with reference to FIG. 1.

The ceramic electronic element 1 comprises a ceramic body 2, internal electrodes 3, terminal electrodes 4, and plating films 5.

The ceramic body 2 is formed by firing a green ceramic body composed of a plurality of ceramic layers 2*a* laminated to each other in which the ceramic layers 2*a* are composed of a dielectric material containing $BaTiO_3$ as a primary component.

The internal electrodes 3 are provided between the ceramic layers 2*a* of the ceramic body 2 and are formed by the steps of coating a plurality of green ceramic layers 2*a* with a conductive paste by a printing method, laminating the green ceramic layers 2*a* provided with the conductive paste so as to form a green ceramic body, and firing the conductive paste provided in the green ceramic body. In addition, one end of each internal electrode 3 is formed so as to be exposed at one of the side surfaces of the ceramic body 2.

The terminal electrodes 4 are formed by coating the side surfaces of the ceramic body 2 with the conductive paste of the present invention followed by firing so as to be in electrical and mechanical contact with the individual ends of the internal electrodes 3, which are exposed to the side surfaces of the ceramic body 2.

The plating films 5 are formed by, for example, electroless plating of Sn, Ni or the like, solder plating or the like, and at least one plating film 5 is formed on each terminal electrode 4.

The material for forming the ceramic body 2 for use in the ceramic electronic element of the present invention is not limited to the embodiment described above, and for example, another dielectric material such as $PbZrO_3$, an insulating material, a magnetic material or a semiconductor material may be used. In addition, the ceramic body 2 may be composed of one ceramic layer 2*a* or any number of the ceramic layers 2*a* may be used for forming the ceramic body 2. The number of internal electrodes 3 for use in the laminated ceramic electronic element of the present invention is not limited to that of the embodiment described above. For example, the internal electrode 3 does not necessarily have to be formed, and when present any number of the internal electrodes 3 may be formed. In addition, the plating films 5 do not necessarily have to be formed, and when formed any number of the plating films may be formed.

EXAMPLES

Hereinafter, the present invention will be described with reference to particular examples.

First, ethyl cellulose as an organic binder, diethylene glycol monobutyl ether (a boiling point of 230° C.) as a first solvent, and SHELLSOL D40 (an initial point of 162° C. and an end point of 197° C. of distillation, manufactured by Showa Shell Sekiyu K.K.) were prepared and were mixed in accordance with the ratios shown in Table 1 below, whereby organic vehicles of samples A to E were formed.

Next, as a comparative example, the organic vehicle and the first solvent used for samples A to E were prepared and were mixed in accordance with the ratio shown in Table 1 below without adding the second solvent, whereby an organic vehicle of sample F was formed.

As a comparative example, the organic vehicle, the first solvent which were used for samples A to E described above and 2-butoxyethanol (boiling point of 170° C.), which had a boiling point lower than that of the first solvent by about 30° C. or more and which dissolved ethyl cellulose used as the organic binder, were prepared and were mixed in accordance with the ratio shown in Table 1 below, whereby an organic vehicle of sample G was formed.

As a further comparative example, the organic vehicle, the first solvent which were used for samples A to E described above and n-dodecane (boiling point of 216° C.), which had a boiling point lower than that of the first solvent by less than about 20° C. and which did not dissolve ethyl cellulose used as the organic binder, were prepared and were mixed in accordance with the ratio shown in Table 1 below, whereby an organic vehicle of sample H was formed.

The compositions of the organic vehicles thus formed are shown in Table 1 below.

TABLE 1

| SAMPLE | ORGANIC VEHICLE (WT %): ORGANIC BINDER ETHYL CELLULOSE | FIRST SOLVENT DIETHYLENE GLYCOL MONOBUTYL ETHER (BOILING POINT 230° C.) | SECOND SOLVENT: SHELLSOL D40* | SECOND SOLVENT: n-DODECANE (BOILING POINT 216° C.) | SECOND SOLVENT: 2-BUTOXYETHANOL (BOILING POINT 170° C.) |
|---|---|---|---|---|---|
| A | 20 | 50 | 30 | — | — |
| B | 15 | 35 | 50 | — | — |
| C | 10 | 20 | 70 | — | — |
| D | 20 | 60 | 20 | — | — |
| E | 10 | 10 | 80 | — | — |
| F | 20 | 80 | — | — | — |
| G | 20 | 40 | — | — | 40 |
| H | 15 | 35 | — | 50 | — |

*Distillation temperature: initial point of 162° C. and end point of 197° C.

Next, 25 wt % of the organic vehicle of each of samples A to D and F to H, 70 wt % of powdered silver as the conductive component and 5 wt % of a B—Si—Pb—O-based glass frit as the inorganic binder were mixed together, and were dispersed by using a ball mill, whereby conductive pastes of samples 1 to 7 were obtained. Since the organic vehicle of sample E was gelled while being held for some hours after preparation, the fluidity required for performing a dipping treatment as a paste was not obtained, and hence, an evaluation could not be performed.

To both side surfaces of a chip-shaped ceramic body which was provided with internal electrodes and which served as a capacitor, the conductive paste of each of samples 1 to 7 was applied by a dipping method so as to form electrode films used as the terminal electrodes. The ceramic bodies provided with the electrode films were dried at 150° C. in a hot air drier, whereby one hundred ceramic electronic elements before firing provided with dried electrode films composed of each of samples 1 to 7 were obtained.

In addition, the dried electrode films of the ceramic electronic elements before firing of samples 1 to 7 were fired at 600° C., whereby ceramic electronic elements of samples 1 to 7 each having outside dimensions of 3.2 mm×2.5 mm×1.5 mm.

Subsequently, the appearances of the terminal electrodes of the ceramic electronic elements of samples 1 to 7 were observed so as to measure the rate of generation of cracks, and an overall evaluation was made based on the rate of generation of wrinkles and the rate of generation of cracks described above. The results are shown in Table 2. The rate of generation of cracks is a ratio of the number of ceramic electronic elements provided with terminals electrodes having cracks therein to one hundred ceramic electronic elements.

TABLE 2

| SAMPLE | CONDUCTIVE PASTE: ORGANIC VEHICLE SAMPLE | CONDUCTIVE PASTE: ORGANIC VEHICLE CONTENT (WT %) | CONDUCTIVE PASTE: CONDUCTIVE COMPONENT POWDERED Ag (WT %) | CONDUCTIVE PASTE: INORGANIC BINDER CONTENT (WT %) | CERAMIC ELETRONIC ELEMENT: RATE OF GENERATION OF WRINKLES ON DRIED ELECTRODE FILM (%) | CERAMIC ELETRONIC ELEMENT: RATE OF GENERATION OF CRACKS IN TERMINAL ELECTRODE (%) |
|---|---|---|---|---|---|---|
| 1 | A | | | | 0 | 0 |
| 2 | B | 25 | 70 | 5 | 0 | 0 |
| 3 | C | | | | 0 | 0 |
| 4 | D | | | | 70 | 50 |
| 5 | F | | | | 100 | 100 |
| 6 | G | | | | 100 | 100 |
| 7 | H | | | | 100 | 80 |

The appearances of dried electrode films formed of samples 1 to 7 for ceramic electronic elements before firing were observed, and the rate of generation of wrinkles were measured. The results are shown in Table 2 below. The rate of generation of wrinkles is a ratio of the number of ceramic electronic elements before firing provided with dried electrode films having wrinkles thereon to one hundred ceramic electronic elements.

As can be seen from Table 2, the rate of generation of wrinkles and the rate of generation of cracks were both 0% for the ceramic electronic elements of samples 1 to 3 formed of the organic vehicles of samples A to C in which the first solvent dissolved the organic binder and the second solvent did not dissolve the organic binder and the content of second solvent was 30 to 70 wt % of the organic vehicle.

In contrast, the ceramic electronic element of sample 4 formed of the organic vehicle of sample D in which the content of the second solvent was 20 wt % of the organic vehicle, the rate of generation of wrinkles and the rate of generation of cracks were high, 70% and 50%, respectively.

In the ceramic electronic elements of samples 5 to 7 formed of the organic vehicles of sample F in which the second solvent was not present, sample G in which a second solvent which dissolved the organic binder was present (i.e., the second solvent not dissolving the organic binder was not present), and sample H in which a second solvent not dissolving the organic binder was present but the boiling point thereof differed from that of the first solvent by less than about 20° C., respectively, the rate of generation of wrinkles was high, 100%, and in addition, the rate of generation of cracks was also high, 80 to 100%.

As has thus been described, the conductive paste of the present invention comprises the conductive component and the organic vehicle, in which the organic vehicle comprises an organic binder, a first solvent dissolving the organic binder, and a second solvent not dissolving the organic binder, wherein the boiling point of the first solvent is higher than that of the second solvent or is higher than the temperature at the end of distillation thereof by about 20° C. or more, and the content of the second solvent is about 30 to 70 wt % of the organic vehicle. Accordingly, a ceramic electronic element having better reliability of electrical properties can be provided in which the generation of wrinkles on the electrode film after drying and the generation of cracks therein after firing can be suppressed.

In addition, the ceramic electronic element of the present invention comprises the ceramic body, and the terminal electrodes formed so as to be in contact with the ceramic body, wherein the terminal electrodes are formed of the conductive paste of the present invention. Accordingly, the generation of wrinkles on the electrode films after drying and the generation of cracks therein after firing can be suppressed, and hence, better reliability of the electrical properties can be attained.

What is claimed is:

1. A conductive paste comprising a conductive material and an organic vehicle;

wherein the organic vehicle comprises an organic binder, a first solvent in which the organic binder is soluble and a second solvent in which the organic binder is not substantially soluble;

wherein the boiling point of the first solvent is higher than either the boiling point of the second solvent or the temperature at the end of distillation thereof by at least about 20° C.; and wherein the content of the second solvent is about 30 to 70 wt % of the organic vehicle.

2. A conductive paste according to claim 1, wherein the boiling point of the first solvent is higher than either the boiling point of the second solvent or the temperature at the end of distillation thereof by at least about 30° C.

3. A conductive paste according to claim 2, further comprising an inorganic binder.

4. A conductive paste according to claim 3, wherein the inorganic binder is a glass frit.

5. A conductive paste according to claim 4, wherein the conductive material is powdered metal.

6. A conductive paste according to claim 1, further comprising an inorganic binder.

7. A conductive paste according to claim 6, wherein the inorganic binder is a glass frit.

8. A conductive paste according to claim 1, wherein the conductive material is powdered metal.

9. A ceramic electronic element comprising a ceramic body having a surface on a portion of which is disposed a conductive paste according to claim 5.

10. A ceramic electronic element comprising a ceramic body having a surface on a portion of which is disposed a conductive paste according to claim 4.

11. A ceramic electronic element comprising a ceramic body having a surface on a portion of which is disposed a conductive paste according to claim 3.

12. A ceramic electronic element comprising a ceramic body having a surface on a portion of which is disposed a conductive paste according to claim 2.

13. A ceramic electronic element comprising a ceramic body having a surface on a portion of which is disposed a conductive paste according to claim 1.

14. A ceramic electronic element according to claim 13, wherein the conductive paste is disposed on two spaced apart portions of said surface.

15. A ceramic electronic element comprising a ceramic body and a pair of terminal electrodes in contact with the ceramic body, wherein the terminal electrodes are a fired conductive paste according to claim 5.

16. A ceramic electronic element comprising a ceramic body and a pair of terminal electrodes in contact with the ceramic body, wherein the terminal electrodes are a fired conductive paste according to claim 4.

17. A ceramic electronic element comprising a ceramic body and a pair of terminal electrodes in contact with the ceramic body, wherein the terminal electrodes are a fired conductive paste according to claim 3.

18. A ceramic electronic element comprising a ceramic body and a pair of terminal electrodes in contact with the ceramic body, wherein the terminal electrodes are a fired conductive paste according to claim 2.

19. A ceramic electronic element comprising a ceramic body and a pair of terminal electrodes in contact with the ceramic body, wherein the terminal electrodes are a fired conductive paste according to claim 1.

* * * * *